(12) United States Patent
Plude et al.

(10) Patent No.: US 6,633,239 B2
(45) Date of Patent: Oct. 14, 2003

(54) CARGO DOOR ELECTRICAL CONTROL AND WARNING INDICATION SYSTEM AND METHOD OF USE

(75) Inventors: Leo W. Plude, Woodinville, WA (US); Todd B. Brouwer, Duvall, WA (US); Mark E. Brighton, Seattle, WA (US); Donald E. Ham, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 09/907,430

(22) Filed: Jul. 17, 2001

(65) Prior Publication Data

US 2003/0038713 A1 Feb. 27, 2003

(51) Int. Cl.$^7$ .............................................. G08B 21/00
(52) U.S. Cl. ....................... 340/945; 340/963; 340/964; 340/980; 340/426; 340/542; 340/545.1; 244/129.3; 244/129.4; 244/129.5
(58) Field of Search ................................ 340/945, 946, 340/948, 952, 953, 959, 960, 963, 964, 980, 982, 426, 542, 545.1; 244/129.5, 129.4, 129.3

(56) References Cited

U.S. PATENT DOCUMENTS

| | | | |
|---|---|---|---|
| 3,718,171 A | 2/1973 | Godwin | |
| 4,470,566 A | * 9/1984 | Fitzgerald | ................ 244/129.5 |
| 4,473,201 A | 9/1984 | Barnes et al. | |
| 4,522,359 A | 6/1985 | Church et al. | |
| 4,680,891 A | 7/1987 | Perkins | |
| 4,681,286 A | 7/1987 | Church et al. | |
| 4,720,065 A | * 1/1988 | Hamatani | ................ 244/129.5 |
| 4,806,910 A | 2/1989 | Salzer | |
| 4,915,326 A | 4/1990 | Plude | |
| 4,994,722 A | 2/1991 | Dolan et al. | |
| 5,163,639 A | 11/1992 | Herrmann et al. | |
| 5,251,851 A | 10/1993 | Herrmann et al. | |
| 5,381,065 A | 1/1995 | Jones | |
| 5,735,487 A | * 4/1998 | Abild et al. | ............. 244/129.5 |
| 5,823,473 A | 10/1998 | Odell et al. | |
| 5,881,973 A | 3/1999 | Agajanian et al. | |
| 5,984,234 A | * 11/1999 | Brouwer et al. | ......... 244/129.5 |
| 6,158,692 A | 12/2000 | Abild et al. | |
| 6,457,675 B1 | * 10/2002 | Plude et al. | ............. 244/129.5 |

* cited by examiner

*Primary Examiner*—Daniel J. Wu
*Assistant Examiner*—Daniel Previl
(74) *Attorney, Agent, or Firm*—Harness, Dickey & Pierce P.L.C.

(57) ABSTRACT

A warning indication system and method of using the same in conjunction with a cargo door of an aircraft. The cargo door is positionable in an opened position; a closed position; a closed and latched position; and a closed, latched, and locked position. The method includes outputting first and second closed signals when the cargo door is in the closed position; outputting first and second latched signals when the cargo door is in the closed and latched position; and outputting first and second locked signals when the cargo door is in the closed, latched, and locked position. All of the signals are then analyzed to positively determine the position of the cargo door, while minimizing the probability of false indications. Various warnings are generated in response to the combination of signals received. The apparatus employs a dual logic system and redundant sensors to provide differing warnings dependent on the phase of flight.

17 Claims, 7 Drawing Sheets

| Fault Condition ⟹ Fault Timing | Fault Occurs on Ground (Prior to Takeoff Thrust Set or 30 Seconds After Landing) | Fault Occurs on Ground (After Takeoff Thrust Set) | Fault Occurs in Flight (After Transition to Air Mode until 30 Seconds After Transition to Ground Mode) |
|---|---|---|---|
| A Single Switch (1 of 6) in Either Channel A or B Indicates Not Closed, or Not Latched, or Not Locked; or 38, 74, 76, 78, 80, 82 Pressure Not Isolated —46 | 96 —MASTER CAUTION<br>98 —DOORS<br>100 —MAIN CARGO * | No Indication for New Faults | No Indication for New Faults |
| Multiple Non-Redundant Switches (up to 3 of 6) In Either Channel A or B Indicate Not Closed, or Not Latched, or Not Locked; or 38, 74, 76, 78, 80, 82 Pressure Not Isolated —46 | 96 —MASTER CAUTION<br>98 —DOORS<br>100 —MAIN CARGO * | No Indication for New Faults. | No Indication for New Faults. |
| Redundant Switches in Channels A and B Both Indicate Not Closed, or Not Latched, or Not Locked 38 and 82 or 74 and 76, or 78 and 80 | 96 —MASTER CAUTION<br>98 —DOORS<br>100 —MAIN CARGO * | 96 —MASTER CAUTION<br>98 —DOORS<br>100 —MAIN CARGO *<br>Takeoff Config. Aural Warning | 96 —MASTER CAUTION<br>98 —DOORS<br>100 —MAIN CARGO * |
| A Single Switch (1 of 6) in Either Channel A or B Falsely Indicates Closed or Latched or Locked *** 38, 74, 76, 78, 80, 82 or Aural Warn Disable 84 Enabled | 96 —MASTER CAUTION<br>98 —OVERHEAD **<br>100 —PSEU ** | N/A | N/A |

\* Once Main Cargo is Lit, the Light Will Remain Lit.
\*\* The "Dispatchable" PSEU Light and OVERHEAD Light Will Illuminate During Master Caution Recall Prior to Takeoff.
\*\*\* Only Detected During Operation of the Door (i.e., Cycling from closed to open).

CARGO DOOR ELECTRICAL CONTROL AND WARNING INDICATION SYSTEM AND METHOD OF USE

FIELD OF THE INVENTION

The present invention generally relates to aircraft cargo doors and, more particularly, relates to an electrical control and warning indication system for use with an aircraft cargo door that employs and a method of using the same.

BACKGROUND OF THE INVENTION

According to the Federal Aviation Administration (FAA), the certification requirements of warning systems on outwardly opening cargo doors state that erroneous closed, latched, and locked indication (i.e., the loss of indication) must be shown to be "improbable", which generally means having a probability of occurrence of less than or equal to 1 per 100,000 flights. Although the current text of the rules do not explicitly require it, it has recently been required by regulatory agencies that the manufacturer of airplanes with outwardly opening cargo doors demonstrate that nuisance indication is also "improbable." In addition, regulatory agencies have expended significant effort to reduce occurrences of unnecessary rejected takeoffs resulting from nuisance warning indications.

It has been possible to meet, although marginally, the improbable erroneous indication requirements with existing single channel indication systems. However, it has not always been possible to meet the requirements that nuisance indication also be improbable. In the instances where it was not possible to comply fully with the nuisance indication requirement, the regulatory agencies involved have noted the difficulty in meeting this requirement and have accepted this limitation.

With reference to single channel systems, it is not generally possible to determine if a warning is accurate, or not, nor has it been possible to reduce the probability of both erroneous and nuisance indication. Because of these limitations, significant reductions in the occurrence of rejected takeoffs due to false cargo door indications have not been realized.

The indication systems on outwardly opening cargo doors having cam-type latches have historically been single channel systems. Because of this, these single channel systems have not been able to determine if the closed, latched, or locked status of the cargo door is erroneous or not. Therefore, if either of the closed, latched, or locked state of the cargo door should transition to the inverse state, a warning message must be provided. If this indication is erroneous, and occurs during the takeoff roll, a risky heavy weight rejected takeoff must be performed.

Closed, latched, and locked status indications of a cargo door is often provided at a cargo door operator's control panel near the cargo door opening. An example of such an indication system is provided in U.S. Pat. No. 5,735,487, commonly owned herewith, the disclosure of which is incorporated herein by reference. However, known control panels have not incorporated features to deactivate the warnings if faults are detected prior to flight and the airplane is being dispatched per Minimum Equipment List conditions with the warning system working improperly.

Accordingly, there exists a need in the relevant art to provide visual and aural warning indications relative to the safety status of an outwardly opening cargo door on transport category airplanes. Moreover, there exists a need in the relevant art to provide a warning indication system that is capable of distinguishing whether a warning indication is false, thereby reducing the occurrence of unnecessary rejected takeoffs. Furthermore, there exists a need in the relevant art to provide a warning indication system that overcomes the disadvantages of the prior art systems.

SUMMARY OF THE INVENTION

According to the principles of the present invention, a cargo door electrical control and warning indication system having an advantageous construction and method of use is provided. The warning indication system is adapted for use with a cargo door of an aircraft. The cargo door being positionable in an opened position; a closed position; a closed and latched position; and a closed, latched, and locked position. The method includes outputting first and second closed signals when the cargo door is in the closed position; outputting first and second latched signals when the cargo door is in the closed and latched position; and outputting first and second locked signals when the cargo door is in the closed, latched, and locked position. All of the signals are then analyzed to positively determine the position of the cargo door, while minimizing the probability of false indications. Various warnings are generated in response to the combination of signals received. The apparatus employs a dual logic system and redundant sensors to provide differing warnings dependent on the phase of flight.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a warning indication logic table illustrating the warning indication according to various timing conditions.

DETAILED DESCRIPTION OF THE PREFERRED EMBODIMENTS

The following description of the preferred embodiment is merely exemplary in nature and is in no way intended to limit the invention, its application, or uses. For example, cargo door 10 warning indication system of the present invention may find utility in a wide range of applications, such as in use with a cargo aircraft, a convertible aircraft, and the like. Although the following description is directed to the warning system as it is used in a conventional, convertible, large-capacity, commercial airliner, the warning system should not be construed to be limited to such applications.

Referring to the figures, a cargo door 10 is an electrically controlled, hydraulically actuated, outwardly opening, non-plug cargo door. Cargo door 10 opens to two positions in order to provide a clear opening for loading and unloading of containerized and/or palletized cargo into and out of a main deck compartment of an aircraft 14. Indication of the closed, latched, and locked status of cargo door 10 is provided at both an door operator control panel 16 and on a flight deck 18. Appropriate colors, in combination with text on the warning and status lights, are used to warn cargo door 10 operator and the flight crew when cargo door 10 is in an unsafe configuration.

Electrical Control System

Figure 1:
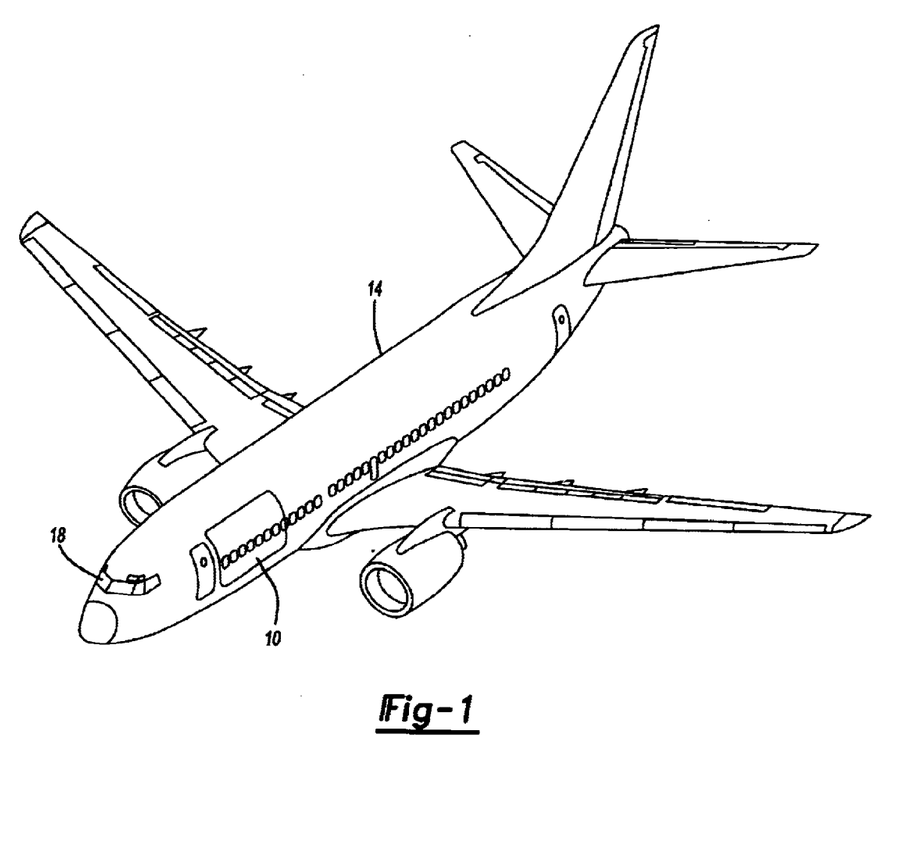
FIG. 1 is a perspective view of an airliner incorporating a cargo door electrical control and warning indication system according to the principles of the present invention.
Figure 2:
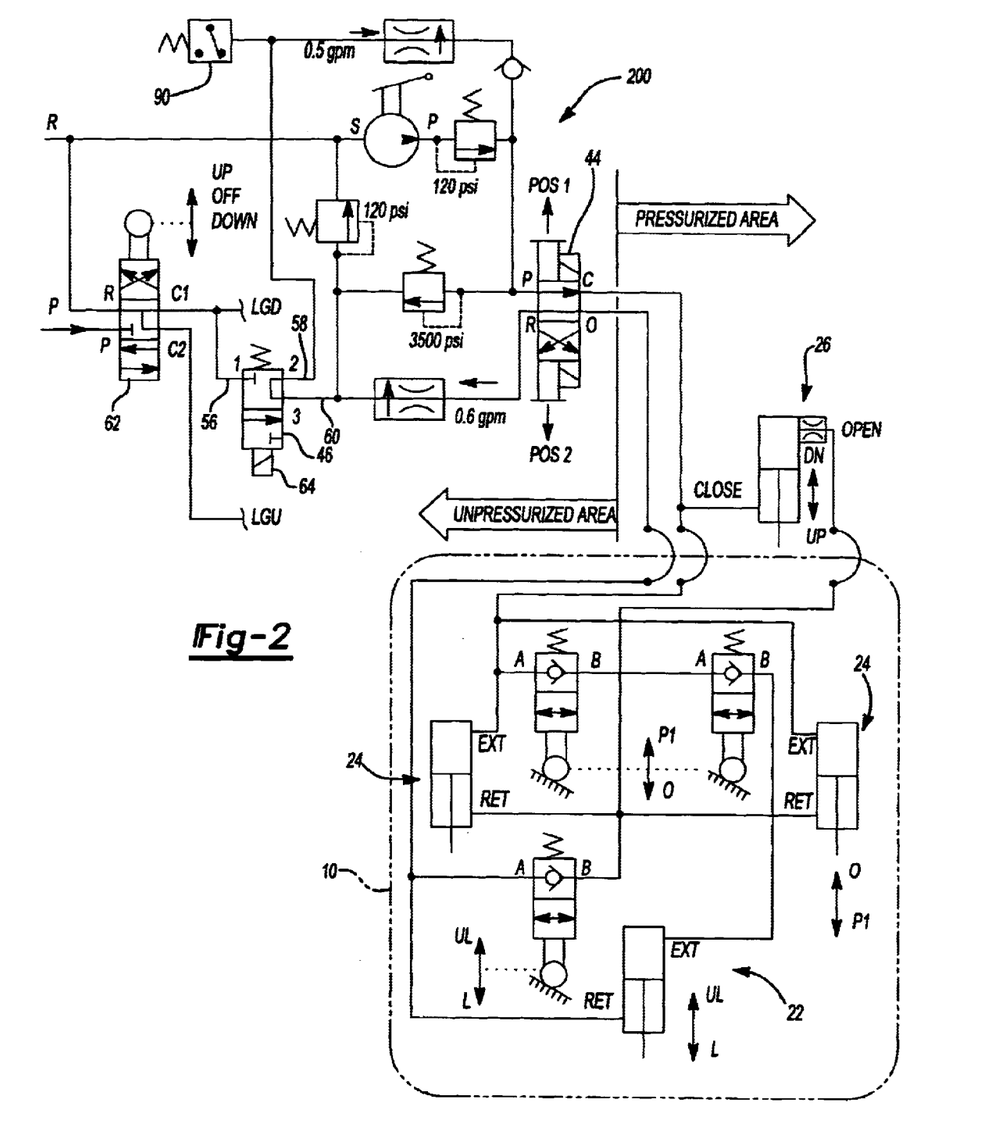
FIG. 2 is a fluid circuit diagram illustrating the warning indication system of the present invention.
Figure 3:
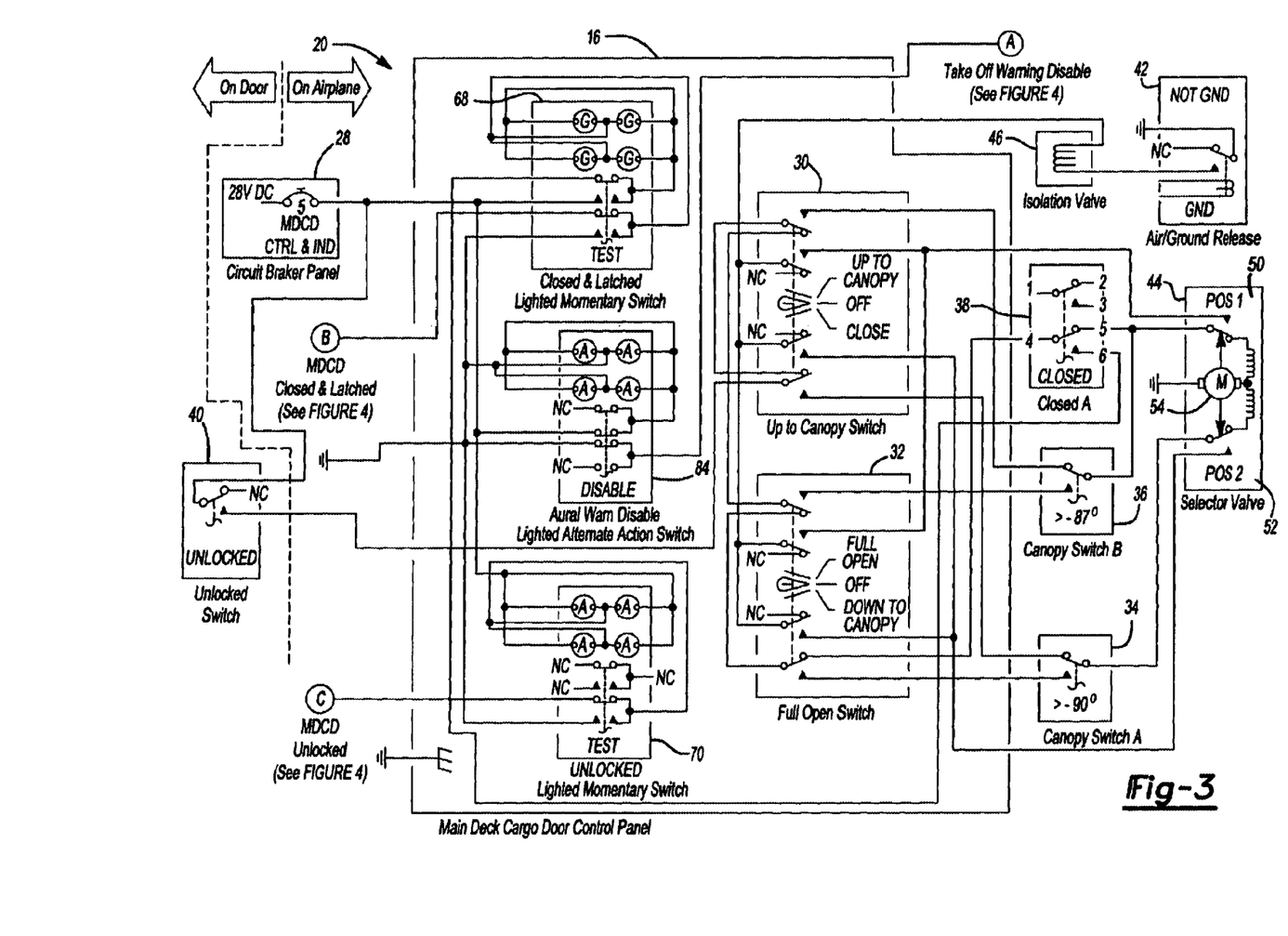
FIG. 3 is an electrical control circuit diagram illustrating the cargo door electrical control and warning indication system according to the principles of the present invention.
Figure 6:
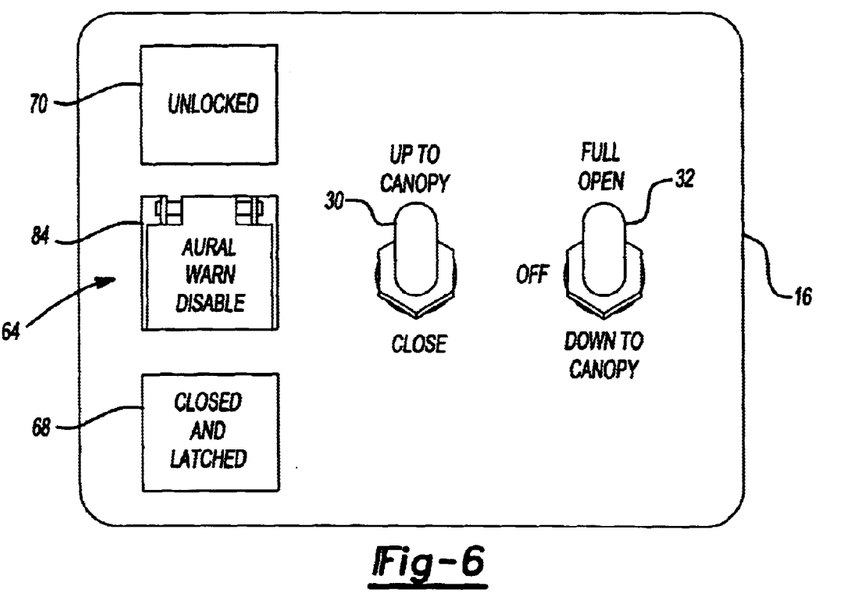
FIG. 6 is a front view of a door operator's control panel according to the present invention.

With particular reference to FIGS. 2, 3, and 6, an electrical control and indication system 20 provides the power required for normal operation of a hydraulic latch mechanism 22, hydraulic pull-in mechanisms 24, and a hydraulic lift mechanism 26. Control and indication system 20 consists of a circuit breaker 28, an UP TO CANOPY switch 30, a FULL OPEN switch 32, a first canopy switch 34, a second canopy switch 36, a door closed A switch 38, a door unlocked switch 40, an air/ground relay 42, and two electrically controlled hydraulic valves, specifically a motor operated selector valve 44 and a solenoid operated isolation valve 46. To electrically command cargo door 10 to open or close, the following conditions must be met: 1) aircraft 14 must be on the ground; 2) the landing gear selector lever must be positioned in the DOWN position (see valve 62 in FIG. 2); 3) the hydraulic system must be operating; 4) there must be 28V DC available from circuit breaker 28; and 5) a lock and vent panel mechanism (not shown) must be in the unlocked position, which causes door unlocked switch 40 to be in the UNLOCKED position.

As best seen in FIG. 6, UP TO CANOPY switch 30 and FULL OPEN switch 32 are located on door operator control panel 16. Door operator control panel 16 is located just inside cargo door 10. UP TO CANOPY switch 30 and FULL OPEN switch 32 are momentary make, three-position, spring loaded, center-off, toggle switches. UP TO CANOPY switch 30 controls cargo door 10 operation up to a canopy position and back to a closed position. FULL OPEN switch 32 controls cargo door 10 operation from the canopy position up to a fully opened position and back to canopy position. UP TO CANOPY switch 30 and FULL OPEN switch 32 are operated in sequence to raise cargo door 10 to full open and to close cargo door 10. If UP TO CANOPY switch 30 and FULL OPEN switch 32 are operated out of sequence or simultaneously, cargo door 10 will not operate. When cargo door 10 is locked, both UP TO CANOPY switch 30 and FULL OPEN switch 32 are electrically disabled by door unlocked switch 40.

Air/ground relay 42 provides the electrical ground to enable operation of solenoid operated isolation valve 46 when aircraft 14 is on the ground. The electrical ground for control and indication system 20 is removed if the air/ground relay 42 is in the air mode (airplane in-flight and air/ground relay 42 is thus opened).

Motor operated selector valve 44 is preferably located in the right hand aft wing to body fairing compartment. Motor operated selector valve 44 is a motor driven, two-position, sequence valve with four ports and a manual override lever. Motor operated selector valve 44 has two internal double pole switches 50, 52. The two positions of motor operated selector valve 44 are identified as POS 1 (door open) and POS 2 (door close) and are marked adjacent to a manual override lever. Position switches 50, 52 alternately complete power circuits to each side of a split winding in a motor 54, thereby allowing motor 54 to drive selector valve 44 to POS 1 or POS 2. When selector valve 44 moves to one extreme position, the switch (either 50, 52) connected to the driven winding is opened, thus automatically stopping motor 54, and the switch (either 52, 50) connected to the opposite winding is closed when selector valve 44 leaves the opposite extreme position. Motor 54 operates on 28V DC and is protected by circuit breaker 28.

Solenoid operated isolation valve 46 is in the same general aircraft location as motor operated selector valve 44. Isolation valve 46 is a solenoid driven, piston-type, two-position isolation valve with three ports—a pressure port 56, an output port 58, and a return port 60. Pressure port 56 is connected to the hydraulic pressure lines downstream of a landing gear selector bypass valve 62. When a solenoid 64 of isolation valve 46 is energized, solenoid 64 moves the piston of isolation valve 46 to connect pressure port 56 to output port 58 and return port 60 is blocked. This position ports hydraulic pressure to motor operated selector valve 44. When solenoid 64 is de-energized, the piston of isolation valve 46 connects output port 58 to return port 60 and pressure port 56 is blocked. This position, wherein pressure port 56 blocked, is the normal de-energized state of isolation valve 46. Solenoid 64 operates on 28V DC and is protected by circuit breaker 28.

When cargo door 10 is closed, door closed A switch 38 prevents uncommanded opening by electrically isolating cargo door 10 open (POS 1) coil 50 of motor operated selector valve 44. First canopy switch 34 and second canopy switch 36 are actuated in response to lift mechanism 26. During opening of cargo door 10 to the canopy and full open positions, second canopy switch 36 provides power to POS 1 of motor operated selector valve 44 when either UP TO CANOPY switch 30 or FULL OPEN switch 32 are respectively selected to the UP TO CANOPY and FULL OPEN positions. During opening to the canopy position, as motor operated selector valve 44 transitions from POS 2 to POS 1, power is removed from the windings of motor operated selector valve 44 and applied to solenoid operated isolation valve 46 via the internal POS 1 switch and UP TO CANOPY switch 30. At approximately 87° of door open rotation, lift mechanism 26 actuates second canopy switch 36, which removes power from solenoid operated isolation valve 46, thereby stopping motion of cargo door 10. To continue opening cargo door 10 from the canopy position (approximately 87° open) to the fully open vertical position, FULL OPEN switch 32 is placed in the FULL OPEN position. Power to solenoid operated isolation valve 46 is provided by FULL OPEN switch 32, via second canopy switch 36 and internal POS 1 switch 50 of motor operated selector valve 44.

To close cargo door 10 from the full open position, first canopy switch 34 provides power to POS 2 winding of motor operated selector valve 44, via first canopy switch 34, when FULL OPEN switch 32 is selected to the DOWN TO CANOPY position. After motor operated selector valve 44 transitions to POS 2, power is removed from POS 2 winding of motor operated selector valve 44 by the internal POS 2 switch and applied to open solenoid operated isolation valve 46 via FULL OPEN switch 32. At approximately 90 degrees of door rotation, first canopy switch 34 is actuated thereby causing power to be removed from POS 2 of solenoid operated isolation valve 46. Cargo door 10 continues to lower until it is stopped in the canopy position by ram locks, which are internal to lift mechanism 26. As the operator removes his hand from FULL OPEN switch 32, FULL OPEN switch 32 returns to the OFF position, which transfers power to POS 1 winding 50 of motor operated selector valve 44, via door closed A switch 38, until motor operated selector valve 44 moves fully to POS 1. Since solenoid operated isolation valve 46 is closed and motor operated selector valve 44 is in POS 1, a hydraulic block is provided that also hydraulically locks cargo door 10 in the canopy position.

To close cargo door 10 from the canopy position, UP TO CANOPY switch 30 must be placed in the CLOSE position. Placing UP TO CANOPY switch 30 in the CLOSE position provides power to the POS 2 winding of motor operated selector valve 44. When motor operated selector valve 44 is in POS 2, power is removed from the POS 2 winding of motor operated selector valve 44 and transferred to solenoid operated isolation valve 46. At this point the hydraulic block is removed and hydraulic pressure is supplied to remove the locks that are internal to lift mechanism 26 allowing cargo door 10 to close.

During a closing operation, if cargo door 10 is in a position above and below the canopy position, when the operator removes his hand from either UP TO CANOPY switch 30 or FULL OPEN switch 32, solenoid operated isolation valve 46 closes first and then motor operated selector valve 44 transitions from POS 2 to POS 1 to provide a hydraulic block to lock cargo door 10 in the intermediate position. Subsequent reapplication of either UP TO CANOPY switch 30 or FULL OPEN switch 32 to continue closing cargo door 10 causes motor operated selector valve 44 to transition from POS 1 to POS 2 to remove the hydraulic block and then solenoid operated isolation valve 46 is opened to apply door closing pressure.

Door Operator Indication System (see FIGS. 3, 4, 5, and 6)

With particular reference to FIGS. 3–6, door operator indication system 66 provides notification to crewmembers, either a door operator or maintenance personnel, that are operating cargo door 10, concerning the status of cargo door 10 and its mechanisms. Indication is provided by two lighted switches 68 and 70 on door operator control panel 16 (FIG. 6). Electrical command signals to lighted switches 68, 70 is provided by four limit switches—a door latched A switch 74, door latched B switch 76, door locked A switch 78, and door locked B switch 80—on cargo door 10 and two limit switches—first canopy switch 34, second canopy switch 36, door closed A switch 38, and a door closed B switch 82—on the door opening of the fuselage.

Lighted switches 68, 70 on door operator control panel 16 are specifically identified as CLOSED AND LATCHED switch 68, UNLOCKED switch 70, and an AURAL WARN DISABLE switch 84. UNLOCKED switch 70 is a lighted momentary switch with four amber LED's. AURAL WARN DISABLE switch 84 is a lighted, guarded, alternate action switch with four amber LED's. CLOSED AND LATCHED switch 68 is a lighted momentary switch with four green LED's. The switch function of CLOSED AND LATCHED switch 68 and UNLOCKED switch 70 is used to provide a "press to test" check of the LED's to insure the LED's are working properly.

When cargo door 10 is in a closed, latched, and locked position, both CLOSED AND LATCHED switch 68 and UNLOCKED switch 70 are extinguished on door operator control panel 16. When cargo door 10 is unlocked, CLOSED AND LATCHED switch 68 and UNLOCKED switch 70 will illuminate on door operator control panel 16. UNLOCKED switch 70 remains illuminated whenever cargo door 10 is unlocked. When cargo door 10 is open or unlatched, CLOSED AND LATCHED switch 68 will extinguish, and conversely it will illuminate when cargo door 10 is closed and latched. AURAL WARN DISABLE switch 84 is normally extinguished during normal door operations.

Electrical wiring connects first canopy switch 34, second canopy switch 36, door closed A switch 38, door unlocked switch 40, and motor operated selector valve 44 to CLOSED AND LATCHED switch 68 and UNLOCKED switch 70 on door operator control panel 16 and to a dual logic system 86 of a Proximity Switch Electronics Unit (PSEU) 88. PSEU 88 receives inputs from a cargo door hydraulic system pressure switch 90, AURAL WARN DISABLE switch 84, door closed A switch 38, door closed B switch 82, door latched A switch 74, door latched B switch 76, door locked A switch 78, and door locked B switch 80 that sense the position of latch mechanism 22, pull-in mechanisms 24, the hydraulic pressure of the cargo door control system, and cargo door 10 itself.

Figure 4:
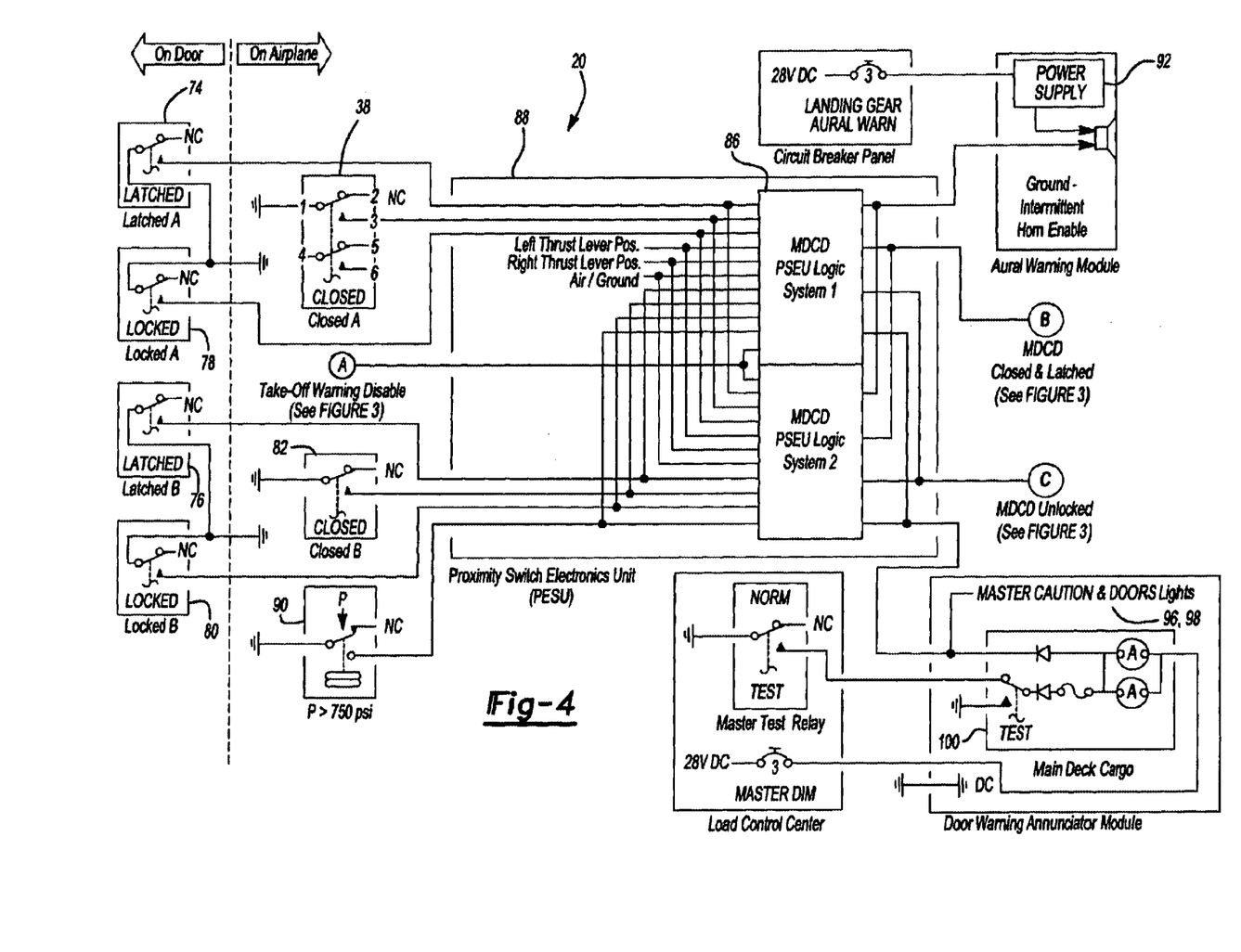
FIG. 4 is an electrical warning indication circuit diagram illustrating the cargo door electrical control and warning indication system according to the principles of the present invention.
Figure 5:
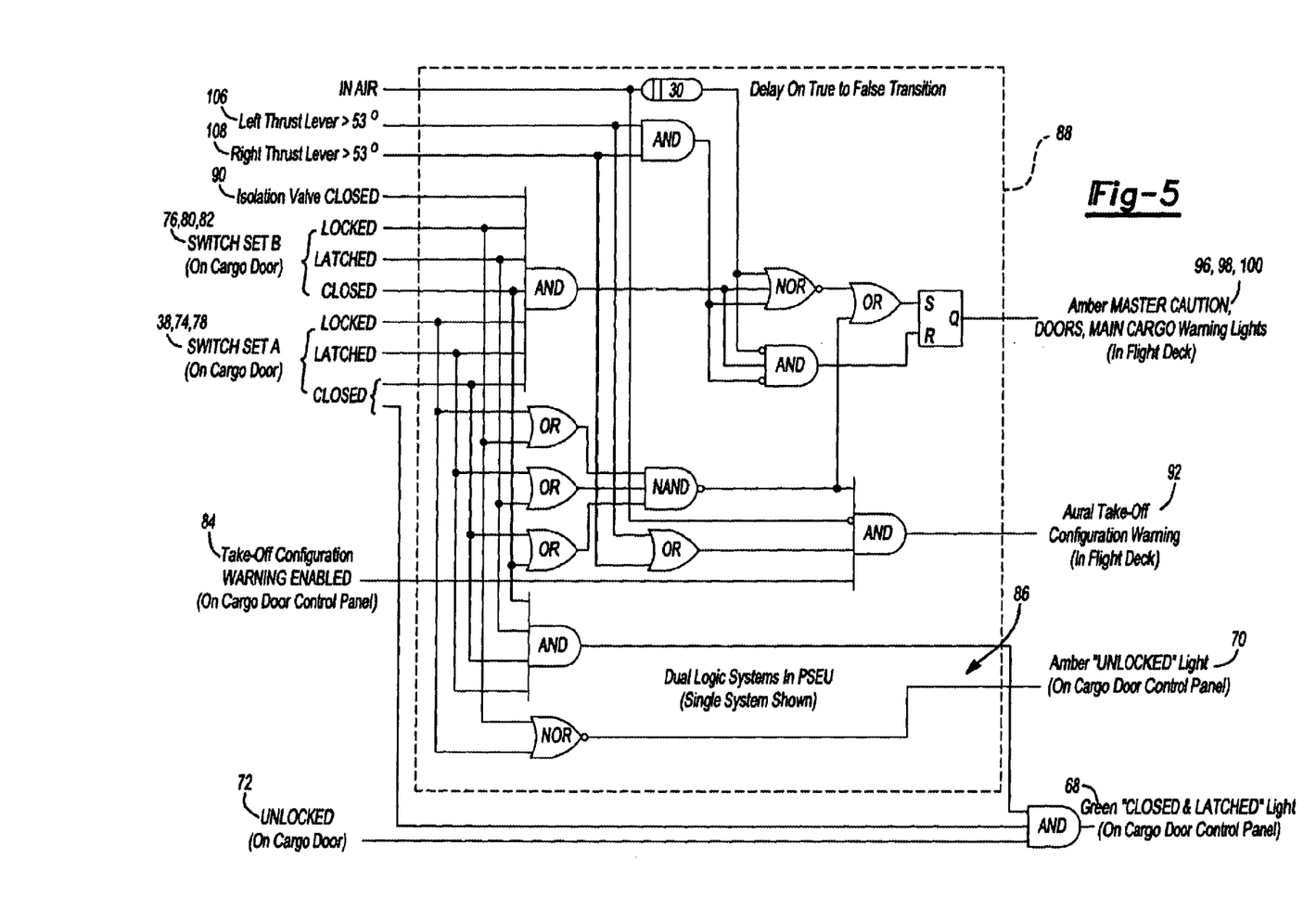
FIG. 5 is a warning indication logic diagram illustrating the cargo door electrical control and warning indication system according to the principles of the present invention.

As described above and best seen in FIG. 4, door unlocked switch 40, door latched A switch 74, door latched B switch 76, door locked A switch 78, and door locked B switch 80 are each disposed on cargo door 10. Along the bottom of the door opening in the fuselage are door closed A switch 38 and door closed B switch 82. As seen in FIGS. 2 and 4, cargo door hydraulic system pressure switch 90 is installed in cargo door hydraulic system 200 to sense whether hydraulic pressure is being applied to cargo door 10 when it should not be (i.e., solenoid operated isolation valve 46 commanded or stuck in the energized position). The presence of a ground at any of these eight switches—38, 40, 74, 76, 78, 80, 82, 90—is registered as a TRUE (Logic 1) condition.

Door locked A switch 78 and door locked B switch 80 are actuated in response to the lock and vent panel mechanism. Door locked A switch 78 and door locked B switch 80 provide positive indication to PSEU 88 when cargo door 10 is locked. Both door locked A switch 78 and door locked B switch 80 are located at the aft end location the locking and venting mechanism. If either or both of door locked A switch 78 and door locked B switch 80 indicate a cargo door not locked condition (Logic 0), amber UNLOCKED switch 70 on door operator control panel 16 will be illuminated.

Door unlocked switch 40 is also actuated in response to the lock and vent panel mechanism. Door unlocked switch 40 functions as electrical interlock to door operator control panel 16 to interrupt electrical current from circuit breaker 28 when cargo door 10 is locked.

Door latched A switch 74 and door latched B switch 76 are actuated in response to latch mechanism 22. Door latched A switch 74 and door latched B switch 76 provide positive indication to PSEU 88 when cargo door 10 is latched. Door latched A switch 74 and door latched B switch 76 are disposed at opposing ends of latch mechanism 22.

Door closed A switch 38 and door closed B switch 82 are actuated in response to strikers (not shown) extending from the bottom edge of cargo door 10. Door closed A switch 38 functions to interrupt electrical current to POS 1 of motor operated selector valve 44 and provides positive indication to PSEU 88 when cargo door 10 is closed (directly to PSEU 88 and via CLOSED AND LATCHED switch 68). Door closed B switch 82 also provides positive indication to PSEU 88 when cargo door 10 is closed. Door closed A switch 38 is installed at the forward end of the lower edge of the fuselage cutout and door closed B switch 82 is at the aft end.

If either or both of door latched A switch 74 and door latched B switch 76 indicate a door not latched condition (Logic 0), or either or both of door closed A switch 38 and door closed B switch 82 indicate a door not closed condition (Logic 0), or cargo door 10 is unlocked (door unlocked switch 40 closed), then CLOSED AND LATCHED switch 68 on door operator control panel 16 will not be illuminated.

AURAL WARN DISABLE switch 84 is provide on door operator control panel 16 to deactivate a takeoff configuration aural warning module 92 (FIG. 4) to enable aircraft 14 to be dispatched using minimum equipment list procedures, such as when control and indication system 20 has faults that can not be repaired at the current airport. When AURAL WARN DISABLE switch 84 is pressed to disable the aural warning from takeoff configuration aural warning module 92, AURAL WARN DISABLE switch 84 will illuminate and remain illuminated until AURAL WARN DISABLE switch 84 is pressed again to enable takeoff configuration aural warning module 92. Disabling takeoff configuration aural warning module 92 prevents subsequent faults in control and indication system 20 from causing an unnecessary rejected takeoff.

Flight Crew Indication System

Figure 7:
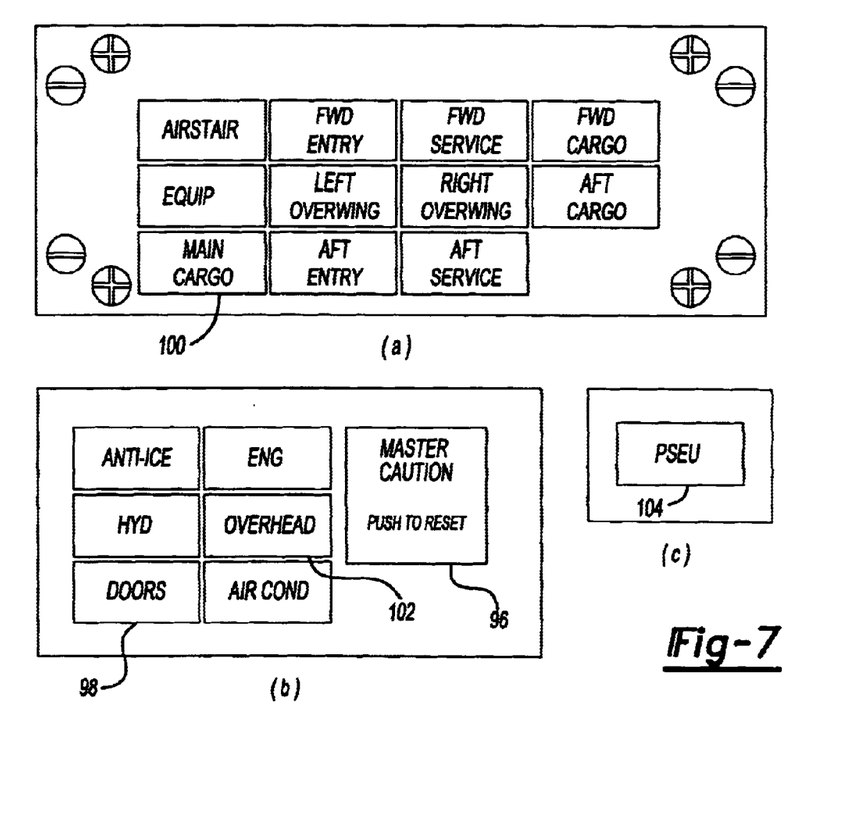
FIG. 7a is a front view of a flight deck forward overhead warning panel according to the present invention.
FIG. 7b is a front view of a flight deck glareshield warning panel according to the present invention.
FIG. 7c is a front view of a flight deck aft overhead warning panel according to the present invention.

As best seen in FIG. 7, control and indication system 20 further includes a flight crew indication system 94, which provides visual and aural warnings to the flight crew members when cargo door 10 is not fully closed, latched, and locked. To this end, PSEU 88 provides an electrical ground to illuminate a MASTER CAUTION warning indicator 96, a DOORS warning indicator 98, a MAIN CARGO warning indicator 100, an OVERHEAD warning indicator 102, and a PSEU warning indicator 104. Aural annunciation (tone) is produced by takeoff configuration aural warning module 92. As described above, AURAL WARN DISABLE switch 84, which provides a logic input to PSEU 88, is located on door operator control panel 16.

Dual logic system 86 of Proximity Switch Electronics Unit (PSEU) 88 checks the position of cargo door 10 via door closed A switch 38, door closed B switch 82, door latched A switch 74, door latched B switch 76, door locked A switch 78, door locked B switch 80, and cargo door hydraulic system pressure switch 90. The logic for each channel is graphically illustrated in FIG. 5 and summarized in FIG. 8. When an unsafe configuration is detected, PSEU 88 provides a ground input (Logic 1) to corresponding MASTER CAUTION warning indicator 96, DOORS warning indicator 98, and/or MAIN CARGO warning indicator 100 and/or takeoff configuration aural warning module 92 in flight deck 18. PSEU 88 has Built-In-Test-Equipment (BITE) to determine if there is a disagreement between the logic outputs of each channel. When an internal fault is detected, PSEU 88 provides a ground (Logic 1) to MASTER CAUTION warning indicator 96, OVERHEAD warning indicator 102, and/or PSEU warning indicator 104 in flight deck 18.

MASTER CAUTION warning indicator 96, DOORS warning indicator 98, and MAIN CARGO warning indicator 100 illuminate when cargo door 10 is not closed, not latched, not locked, or pressure is still applied. All three warning lights illuminate when either a single, or multiple non-redundant, or redundant switch indicates not closed, not latched, or not locked on the ground prior to advancing a left trust lever position 106 or a right thrust lever position 108 beyond 53 degrees, or 30 seconds after landing as detected by air/ground relay 42. No indication is provided for new faults when a single or multiple non-redundant switch indicates not closed, not latched, or not locked while in-flight. MASTER CAUTION warning indicator 96 also illuminates when a single switch falsely indicates in either logic system a closed, latched, or locked. False indication is detected when cargo door 10 is unlocked, unlatched, and opened by checking to see that all ground signals (Logic 1) have transitioned to Logic 0(i.e., open).

If both door closed A switch 38 and door closed B switch 82 indicated not closed, or both door latched A switch 74 and door latched B switch 76 indicate not latched, or both door locked A switch 78 and door locked B switch 80 indicate not locked, and either trust lever is advanced beyond 53 degrees on the ground, then an aural warning is generated from takeoff configuration aural warning module 92. This is in addition to illumination of MASTER CAUTION warning indicator 96, DOORS warning indicator 98, and MAIN CARGO warning indicator 100 warning lights. AURAL WARN DISABLE switch 84 is operated to disable takeoff configuration aural warning module 92. If the aural warning has been disabled, dispatchable PSEU warning indicator 104 and OVERHEAD warning indicator 102 will illuminate when the pilots do a normal Master Caution Recall prior to takeoff.

The present invention being thus described provides a warning indication system that can distinguish if the indication system is providing valid cargo door status so that unnecessary rejected takeoffs are not performed. In addition, the present invention provides a means whereby warnings for non-significant failures that occur during the takeoff roll and in flight, are identified and stored for subsequent display upon landing. The present invention still further provide a means to deactivate the aural warning if faults are detected in the warning circuit before flight, while simultaneously providing a visual warning to the pilots in flight deck 18 that deactivation of the aural warning is active.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of indicating a position of a closure member system of an aircraft, said closure member system being positionable in an opened position, a closed position, a closed and latched position, and a closed, latched, and locked position relative to an opening of said aircraft; said method comprising:

outputting a first closed signal when the closure member system is in said closed position;

outputting a second closed signal when the closure member system is in said closed position;

outputting a first latched signal when the closure member system is in said closed and latched position;

outputting a second latched signal when the closure member system is in said closed and latched position;

outputting a first locked signal when the closure member system is in said closed, latched, and locked position;

outputting a second locked signal when the closure member system is in said closed, latched, and locked position;

analyzing the combination of said first closed signal, said second closed signal, said first latched signal, said second latched signal, said first locked signal, and said second locked signal to positively determine the position of said closure member system and produce a position signal; and selectively outputting warnings in response to said position signal.

2. The method according to claim 1, further comprising:

outputting an air/ground signal when the aircraft is on the ground; and selectively outputting a first of said warnings when said air/ground signal and any one of said first closed signal, second closed signal, first latched signal, second latched signal, first locked signal, and second locked signal are received.

3. The method according to claim 2, further comprising:

selectively outputting a second of said warnings when said first closed signal and said second closed signal are simultaneously received, when said first latched signal and said second latched signal are simultaneously received, or when said first locked signal and said second locked signal are simultaneously received, irrespective of whether said air/ground signal is received.

4. The method according to claim 1 wherein said warnings comprise a visual warning and an aural warning.

5. The method according to claim 4, further comprising:

selectively disabling one of said visual warning and said aural warning.

6. The method according to claim 5 wherein said selectively disabling one of said visual warnings and said aural warnings, further comprising:

outputting a visual indication generally adjacent said closure member system and in a flight deck of the aircraft of said disabling one of said visual warning and said aural warning.

7. The method according to claim 1, further comprising:

outputting a hydraulic pressure signal when a hydraulic pressure is being applied to said closure member system; and selectively outputting said warnings when said hydraulic pressure signal is received and said closure member system is in said closed, latched, and locked position.

8. An indication system for an aircraft, said indication system comprising:

a closure member system positionable in an opened position, a closed position, a closed and latched position, and a closed, latched, and locked position relative to an opening of the aircraft;

a first closed sensor and a second closed sensor each coupled between said closure member system and the aircraft, said first closed sensor and said second closed sensor each independently operable to output a signal when said closure member system is in said closed position;

a first latched sensor and a second latched sensor each coupled between said closure member system and the aircraft, said first latched sensor and said second latched sensor each independently operable to output a signal when said closure member system is in said closed and latched position;

a first locked sensor and a second locked sensor each coupled between said closure member system and the aircraft, said first locked sensor and said second locked sensor each independently operable to output a signal when said closure member system is in said closed, latched, and locked position; and a dual channel logic system operably coupled to each of said sensors, said dual channel logic system outputting a discrete warning in response to said signals of each of said sensors.

9. The indication system according to claim 8, further comprising:

an air/ground sensor mountable to the aircraft, said air/ground sensor capable of outputting an air/ground signal when the aircraft is on the ground, said dual channel logic system being operably coupled to said air/ground sensor for receiving said air/ground signal so as to output said discrete warning in response to said air/ground signal.

10. The indication system according to claim 8, further comprising:

a hydraulic pressure sensor disposed within said closure member system, said hydraulic pressure sensor outputting a signal when hydraulic pressure is detected within said closure member system, said dual channel logic system being operably coupled to said hydraulic pressure sensor for receiving said signal from said hydraulic pressure sensor so as to output said discrete warning in response thereto.

11. A method of indicating a position of a cargo door system of an aircraft, said cargo door system being positionable in an opened position, a closed position, a closed and latched position, and a closed, latched, and locked position relative to an opening of said aircraft; said method comprising:

outputting a first closed signal and a second closed signal when the cargo door system is in said closed position;

outputting a first latched signal and a second latched signal when the cargo door system is in said closed and latched position;

outputting a first locked signal and a second locked signal when the cargo door system is in said closed, latched, and locked position;

outputting an air/ground signal when the aircraft is on the ground;

analyzing the particular combination of said first closed signal, said second closed signal, said first latched signal, said second latched signal, said first locked signal, and said second locked signal to positively determine the position of said cargo door system and produce a position signal; and selectively outputting warnings in response to said position signal.

12. The method according to claim 11, further comprising:

selectively outputting a first of said warnings when said air/ground signal and any one of said first closed signal, second closed signal, first latched signal, second latched signal, first locked signal, and second locked signal are received.

13. The method according to claim 12, further comprising:

selectively outputting a second of said warnings when said first closed signal and said second closed signal are simultaneously received, when said first latched signal and said second latched signal are simultaneously received, or when said first locked signal and said second locked signal are simultaneously received, irrespective of whether said air/ground signal is received.

14. The method according to claim 11 wherein said warnings comprise a visual warning and an aural warning.

15. The method according to claim 14, further comprising:

selectively disabling one of said visual warning and said aural warning.

16. The method according to claim 15 wherein said selectively disabling one of said visual warnings and said aural warnings, further comprising:

outputting a visual indication generally adjacent said closure member system and in a flight deck of the aircraft of said disabling one of said visual warning and said aural warning.

17. The method according to claim 11, further comprising:

outputting a hydraulic pressure signal when a hydraulic pressure is being applied to said closure member system; and selectively outputting said warnings when said hydraulic pressure signal is received and said closure member system is in said closed, latched, and locked position.

* * * * *